United States Patent

Mayumi et al.

[11] Patent Number: 5,995,891
[45] Date of Patent: Nov. 30, 1999

[54] AUTOMOTIVE OCCUPANT RESTRAINT SYSTEM WITH ENERGY RESERVE CIRCUIT

[75] Inventors: Nobuo Mayumi, Toyohashi; Nobumasa Ueda, Aichi-ken, both of Japan

[73] Assignee: Denso Corporation, Kariya, Japan

[21] Appl. No.: 08/847,335

[22] Filed: Apr. 23, 1997

[30] Foreign Application Priority Data

Apr. 24, 1996 [JP] Japan ................................. 8-102968

[51] Int. Cl.⁶ .......................... B60R 21/32; G06G 7/76
[52] U.S. Cl. .......................... 701/45; 701/29; 701/46; 280/735; 340/438; 307/10.1
[58] Field of Search .................... 701/36, 45, 46, 701/47; 280/734, 735, 728.1; 180/282, 268, 271; 307/10.1, 9.1, 12.1, 64, 66, 87; 340/310.01, 438, 436, 669; 323/312, 315; 324/429; 320/152, 155, 123; 322/28, 33, 99

[56] References Cited

U.S. PATENT DOCUMENTS

| | | | |
|---|---|---|---|
| 3,916,376 | 10/1975 | Tuttle | 280/735 |
| 4,938,504 | 7/1990 | Fukuda et al. | 280/735 |
| 4,974,873 | 12/1990 | Kaiguchi et al. | 280/735 |
| 5,045,835 | 9/1991 | Masegi et al. | 280/735 |
| 5,135,254 | 8/1992 | Masegi et al. | 280/735 |
| 5,149,985 | 9/1992 | Fujiwara | 307/10.1 |
| 5,187,382 | 2/1993 | Kondo | 280/735 |
| 5,191,500 | 3/1993 | Hatano et al. | 307/10.1 |
| 5,216,284 | 6/1993 | Mattes et al. | 307/10.1 |
| 5,331,211 | 7/1994 | Kondo et al. | 280/735 |
| 5,341,034 | 8/1994 | Mattews | 307/66 |
| 5,420,790 | 5/1995 | Ravas, Jr. et al. | 701/41 |
| 5,488,283 | 1/1996 | Dougherty et al. | 307/10.1 |
| 5,493,270 | 2/1996 | Kondo | 280/735 |
| 5,501,486 | 3/1996 | Fujita et al. | 280/735 |
| 5,554,890 | 9/1996 | Kinoshita | 280/728.1 |
| 5,602,736 | 2/1997 | Toya et al. | 280/735 |
| 5,638,274 | 6/1997 | Konishi et al. | 701/45 |
| 5,675,242 | 10/1997 | Nakano | 280/734 |
| 5,747,890 | 5/1998 | Yin | 307/87 |
| 5,760,489 | 6/1998 | Davis et al. | 280/735 |

FOREIGN PATENT DOCUMENTS 4-506295  10/1992  Japan .
7-096815  4/1995  Japan .

*Primary Examiner*—Jacques H. Louis-Jacques
*Attorney, Agent, or Firm*—Pillsbury Madison & Sutro LLP

[57] ABSTRACT

An automotive occupant restraint system with a simple and compact energy reserve circuit is provided which includes an occupant restraint mechanism, a step-up circuit, a backup capacitor, a crash monitor, a firing circuit, and a switching circuit. The step-up circuit steps up the voltage supplied from a battery to charge the backup capacitor up to a given voltage level. The crash monitor monitors a vehicle crash to provide a crash signal. The firing circuit is responsive to the crash signal to activate the occupant restraint mechanism. The switching circuit selects between a first and a second power supply mode. The first power supply mode is established to block communication between the backup capacitor and the crash monitor when a sufficient amount of electrical energy of the battery is supplied to the crash monitor, while the second power supply mode is established to communicate the backup capacitor to the crash monitor when the electrical energy supplied from the battery drops below a given voltage level to supply electrical energy stored in the backup capacitor to the crash monitor.

2 Claims, 4 Drawing Sheets

AUTOMOTIVE OCCUPANT RESTRAINT SYSTEM WITH ENERGY RESERVE CIRCUIT

BACKGROUND OF THE INVENTION

1. Field of Invention

The present invention relates generally to an improved circuit for an occupant restraint system for automotive vehicles such as an airbag system or a pretensioner for a seat belt, and more particularly to an energy reserve circuit designed to supply electrical energy to operate an occupant restraint system for a given period of time after the power supply from a main power source to the occupant restraint system is interrupted by a vehicle crash.

2. Description of Related Art

In a typical air bag system for automotive vehicles, an acceleration sensor monitors the acceleration of the vehicle. When it is determined that a vehicle crash has occurred based on the monitored acceleration of the vehicle, a squib is fired to deploy an air bag to protect an occupant from the impact.

A firing circuit activating the squib and a crash monitor are usually supplied with electric power from a storage battery mounted in the vehicle. A backup capacitor serves as an auxiliary power supply for the firing circuit and the crash monitor if electrical communication of the firing circuit and the crash monitor with the storage battery is blocked by the impact of the vehicle crash. The backup capacitor must have sufficient capacitance to store enough electrical energy to activate the squib for a given period of time after the power supply to the firing circuit and the crash monitor is blocked.

Thus, actuating the air bag system within a normal operating voltage range (e.g., 6 V to 16 V) requires a backup capacitor having a capacitance so large as to be impractical. In order to alleviate this problem, a conventional air bag system uses a step-up circuit which increases the voltage of the storage battery for charging the backup capacitor up to a given increased voltage (e.g., 14 V). This allows use of the backup capacitor having a smaller capacitance.

The conventional air bag system, however, has a drawback. The backup capacitor is usually connected directly to the firing circuit and the crash monitor. The step-up circuit is thus to designed to charge the backup capacitor up to the given increased voltage and to hold it for actuating both the firing circuit and the crash monitor if the battery voltage drops. Specifically, the step-up circuit is required to have the ability to output high-power (e.g., 14 V, 100 mA). Such a step-up circuit usually needs large-sized parts such as coils, which can counter attempts to miniaturize or reduce manufacturing costs.

In order to avoid the above drawback, a system taught in Japanese Patent First Publication No. 7-96815 uses two backup capacitors for a firing circuit and a crash monitor which are charged by a step-up circuit. A switching transistor is disposed between the backup capacitors. The backup capacitors are usually connected to each other by an on-operation of the switching transistor, and are disconnected by an off-operation of the switching transistor when the crash monitor outputs a firing signal to the firing circuit in the event of a vehicle collision. If the communication of the step-up circuit with a storage battery is blocked, the firing circuit uses the electrical energy stored in either of the backup capacitors to deploy an air bag.

The above prior art system, however, has at least two disadvantages; one, that the switching transistor does not contribute to reduction in output ability of the step-up circuit, and two, that the use of the two backup capacitors results in increasing component parts.

SUMMARY OF THE INVENTION

It is therefore a principal object of the present invention to avoid the disadvantages of the prior art.

It is another object of the present invention to provide a simple and compact circuit of a vehicle occupant restraint system. The system is further designed to supply enough electric power to operate the system for a given period of time after the power supply from a main power source to the system is interrupted by a vehicle crash.

According to one aspect of the present invention, an occupant safety apparatus for a vehicle comprises: (a) an occupant protecting mechanism protecting a vehicle occupant from impact due to a vehicle crash; (b) a step-up circuit stepping up the voltage supplied from a battery; (c) a backup capacitor connected to the battery and the step-up circuit to maintain store electrical energy at a given voltage; (d) a crash monitor which monitors deceleration of the vehicle for determining whether a vehicle crash has occurred or not and providing a corresponding crash signal; (e) an actuation control circuit responsive to the crash signal from the crash monitor to actuate the occupant protecting mechanism; and (f) a switching circuit that selects between a first and a second power supply mode, the first power supply mode being established to disconnect the backup capacitor from the crash monitor when the electrical energy of the battery is within a preselected operating voltage range, the second power supply mode being established to connect the backup capacitor to the crash monitor when the electrical energy of the battery drops below a given voltage level for supplying electrical energy stored in the backup capacitor to the crash monitor within the preselected operating voltage range.

In the preferred mode of the invention, the switching circuit includes a voltage detector, a semiconductor device and a control circuit. A voltage detector detects the voltage of the electrical energy of the battery supplied to the crash monitor. A semiconductor device establishes and blocks the communication between the backup capacitor and the crash monitor. A control circuit which responds to a drop in voltage as detected by the voltage detector. When the voltage drops below the given voltage level, the semiconductor device establishes the communication between the backup capacitor and the crash monitor in the second power supply mode.

The switching circuit includes a first voltage detector detects the voltage of the electrical energy of the battery supplied to the crash monitor. The semiconductor device controls the degree of the communication between the backup capacitor and a first circuit path. The semiconductor switching element blocks the communication between the first circuit path and a second circuit path. Connected to the crash monitor in the first power supply mode when the electrical energy of the battery is supplied to the crash monitor falls within the preselected operating voltage range and establishing the communication between the first circuit path and the second circuit path in the second power supply mode when the electrical energy of the battery drops below the given voltage level. The second voltage detector detects the voltage of an output from the semiconductor device. The control circuit controls the semiconductor device to decrease the degree of the communication between the backup capacitor and the first circuit path to apply a first voltage to the semiconductor switching element which blocks the communication between the first and second circuit paths when the voltage detected by the first voltage detector is within the preselected operating voltage range and to increase the degree of the communication between the backup capacitor and the first circuit path to apply a second voltage greater than the first voltage to the semiconductor switching element to establish the communication between the first and second circuit paths when the first voltage detector detects a drop of the voltage of the electrical energy of the battery supplied to the crash monitor below the given voltage level for supplying the electrical energy stored in the backup capacitor to the crash monitor within the preselected operating voltage range.

The semiconductor device is a transistor. The semiconductor switching element includes a diode which is connected at an anode to the transistor and at a cathode to the crash monitor. The first and second voltage detectors detect the voltages appearing at the cathode and the anode of the diode, respectively. The control circuit includes a reference power supply and a differential amplifier which a reference power supply produces a reference voltage. The differential amplifier amplifies the difference between the reference voltage and the voltage detected by the second voltage detector. The output of the differential amplifier controls the transistor so as to provide the first voltage to the diode when the voltage detected by the second voltage detector is lower than the voltage detected by the first voltage detector. The differential amplifier also amplifies the difference between the reference voltage and the voltage detected by the first voltage detector. The output of the differential amplifier controls the transistor so as to provide the second voltage to the diode when the voltage detected by the first voltage detector is decreased below the voltage detected by the second voltage detector.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

DESCRIPTION OF THE PREFERRED EMBODIMENT

Figure 1:
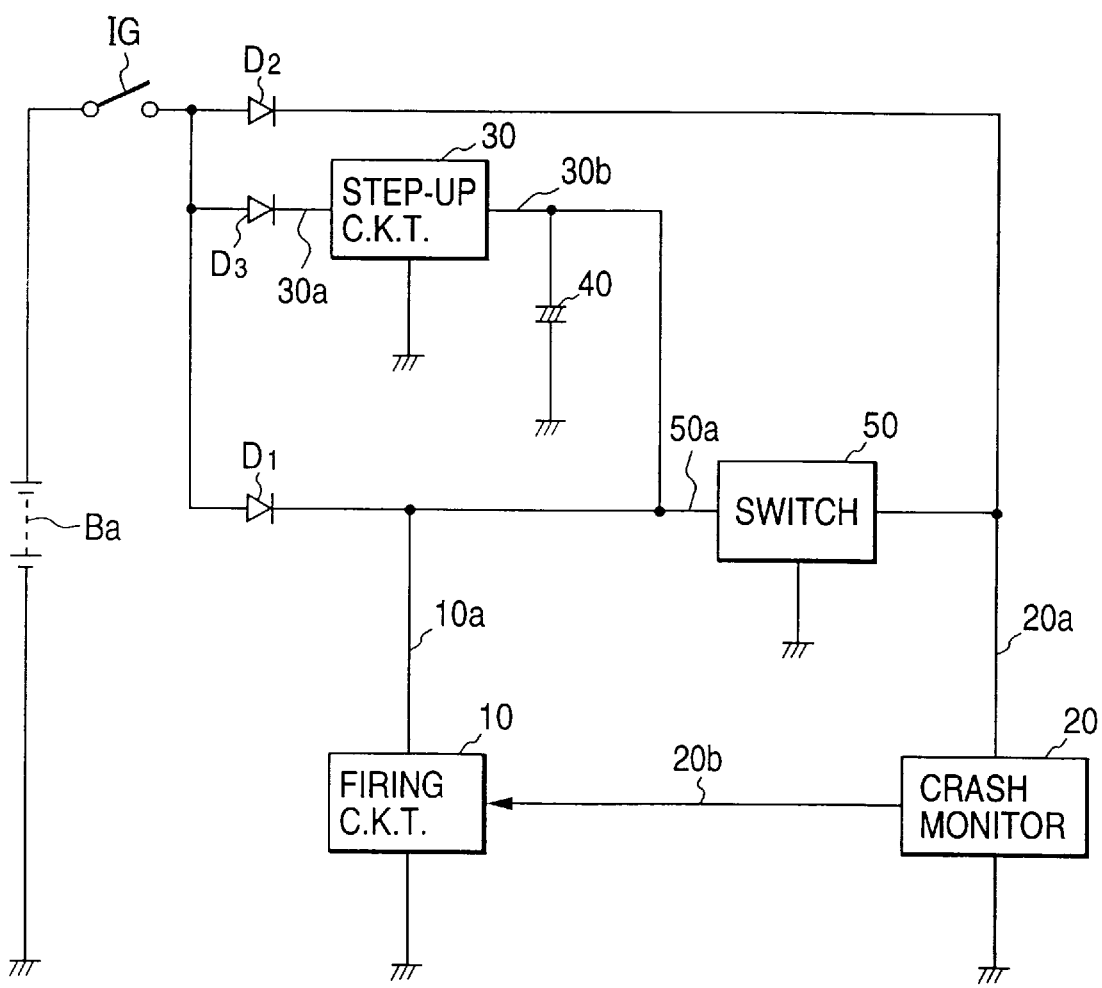
FIG. 1 is a circuit diagram which shows an occupant restraint system for an automotive vehicle according to the present invention.

FIG. 1, shows an occupant restraint system for automotive vehicles according to the present invention.

The occupant restraint system is installed near a driver's seat of the vehicle and includes a conventional air bag (not shown), a firing circuit 10, a crash monitor 20, a step-up circuit 30, a backup capacitor 40, and a switching circuit 50.

Figure 2:
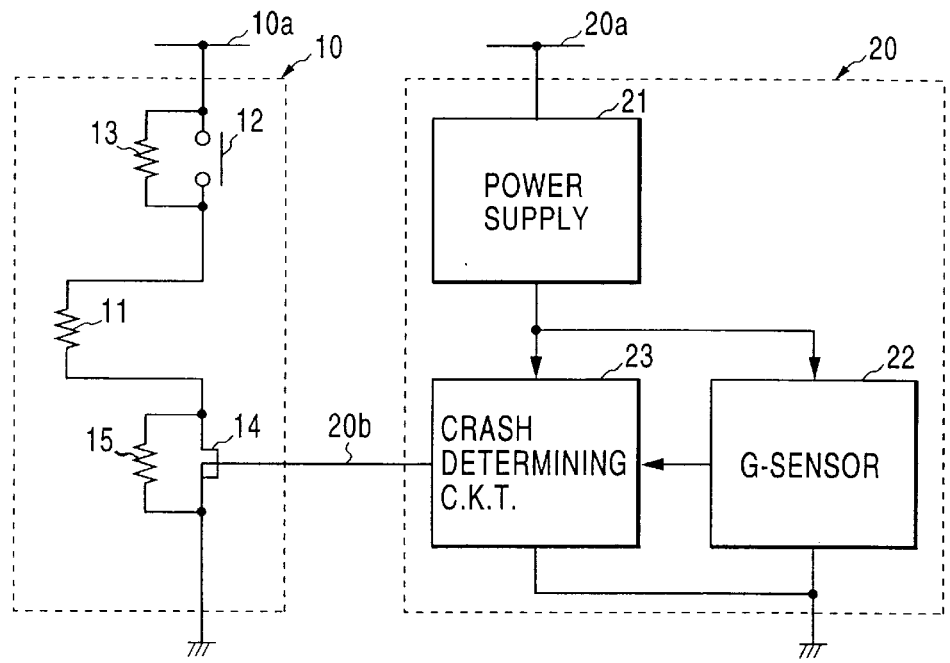
FIG. 2 is a circuit diagram which shows a firing circuit and a crash monitor of the occupant restraint system shown in FIG. 1.

The firing circuit 10 includes, as shown in FIG. 2, a squib 11. The squib, as shown in FIG. 1, is connected at one end to a positive terminal of a storage battery Ba through a parallel circuit consisting of a safing sensor 12, a resistor 13, a conductor 10a, a reverse-blocking diode D1, and an ignition switch IG and at the other end to ground through a parallel circuit consisting of an ignition transistor 14 and a resistor 15.

The safing sensor 12 is made of a normal open type mechanical switch. The current passes through when the switch is turned on or when the deceleration of the vehicle reaches a given value. Specifically, the safing sensor 12 allows, in an on-state, the voltage from the battery Ba to be applied directly to the squib 11 through the ignition switch IG and the diode D1. The ignition transistor 14 responds to a crash signal, that is output from the crash monitor 2. The resistor 15 is connected between a drain and a source of the ignition transistor 14.

When there is no impact acting on the vehicle body due to a vehicle crash, the ignition transistor 14 and the safing sensor 12 are off so that a small amount of current flows through the resistor 13, the squib 11, and the resistor 15 for detection of a failure of the firing circuit 10. Alternatively, when the ignition transistor 14 and the safing sensor 12 are turned on by a vehicle crash event, the current or air bag deployment signal flows from the battery Ba through the diode D1, the safing sensor 12, the squib 11, and the drain and source of the ignition transistor 14.

The crash monitor 20 includes, as shown in FIG. 2, a stabilizing power source 21, a crash determining circuit 23, and an acceleration sensor (i.e., G-sensor) 22. The stabilizing power source 21 stabilizes the voltage supplied from the battery Ba through the ignition switch IG, the diode D2, and the conductor 20a. The power source also provides a constant voltage of 4.4 V to the G-sensor 22 and the crash determining circuit 23.

The G-sensor 22 monitors the acceleration of the vehicle and provides a signal indicative thereof to the crash determining circuit 23. The crash determining circuit 23 responds to the signal indicative of a vehicle crash event from the G-sensor 22 and provides a crash signal to the gate of the ignition transistor 14 through the conductor 20b thus turning on the ignition transistor 14. The crash monitor 20 is designed to operate without the electrical energy stored in the backup capacitor 40, that is, the voltage stepped up by the step-up circuit 30, as long as the voltage applied from the battery Ba to the conductor 20a is greater than 4.8 V.

The step-up circuit 30 is, as clearly shown in FIG. 1, supplied with the electrical energy from the battery Ba through the ignition switch IG, the reverse-blocking diode D3, and the conductor 30a and charges the backup capacitor 40 up to a given voltage.

Figure 3:
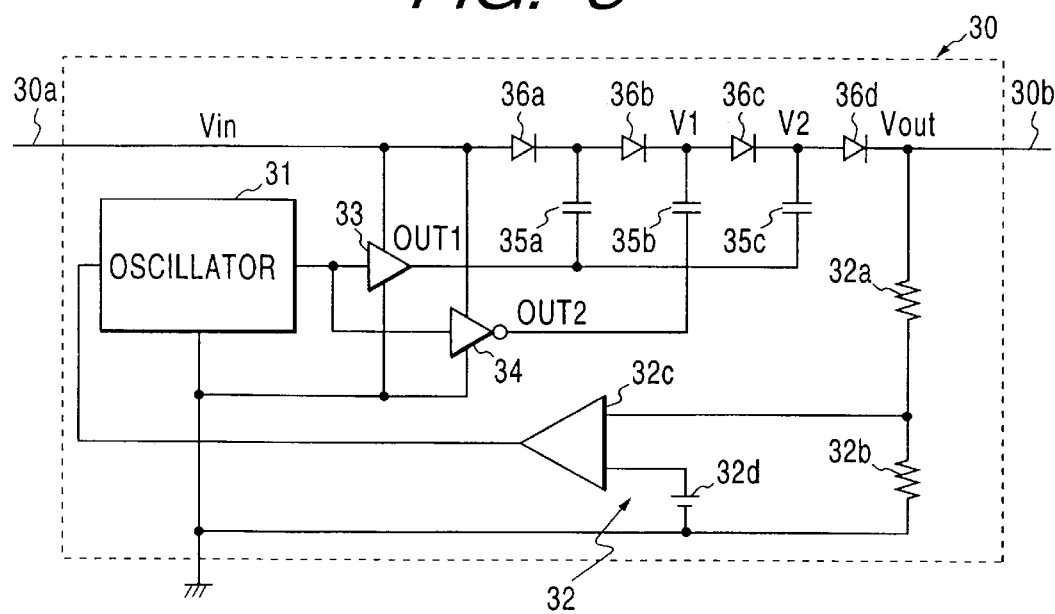
FIG. 3 is a circuit diagram which shows a step-up circuit.

Internally, the step-up circuit 30 includes, as shown in FIG. 3, an oscillator 31, an output voltage detector 32, step-up drivers 33 and 34, step-up pumping capacitors 35a to 35c, and diodes 36a to 36d.

The oscillator 31 provides oscillation signals to the step-up drivers 33 and 34 to actuate them under control of the output voltage detector 32. The step-up driver 33 operates the step-up pumping capacitors 35a and 35c, while the step-up driver 34 operates the step-up pumping capacitor 35b. The step-up drivers 33 and 34 are reversed in logical operation.

The capacitor 35a is disposed between an output terminal of the step-up driver 33 and a junction of a cathode of the diode 36a and an anode of the diode 36b. The capacitor 35b is disposed between an output terminal of the step-up driver 34 and a junction of a cathode of the diode 36b and an anode of the diode 36c. The capacitor 35c is disposed between the output terminal of the step-up driver 33 and a junction of a cathode of the diode 36c and an anode of the diode 36d.

The diodes 36a to 36d are connected in series in the same polarity. The diode 36a is, as shown in FIGS. 1 and 3, connected at its anode to the cathode of the diode D3 through the conductor 30a. The diode 36d is connected at its cathode to the backup capacitor 40 and the switching circuit 50 through the conductor 30b.

When no load is connected to the cathode of the diode 36d, and the oscillator 31 is in operation, the voltage V1 appearing across the diodes 36b and 36c, the voltage V2 appearing across the diodes 36c and 36d, and the output voltage Vout outputted from the cathode of the diode 36d are given by the following equations (1) to (3).

$$V1 = Vin + (Vin - Vb - Va) - 2Vf \quad (1)$$

$$V2 = V1 + (Vin - Vb - Va) - Vf \quad (2)$$

$$Vout = V2 + (Vin - Vb - Va) - Vf \quad (3)$$

where Vf indicates the forward voltage drop of each of the diodes 36a to 36b, Vin indicates the voltage at the conductor 30a inputted from the battery Ba through the ignition switch IG and the diode D3, Va indicates the voltage drop of a low-level output from corresponding one of the step-up drivers 33 and 34, and Vb indicates a voltage drop of a high-level output from corresponding one of the step-up drivers 33 and 34.

Thus, substituting V2 in the equation (2) for the equation (3), the equation (4) is $$Vout = Vin + 3(Vin - Vb - Va) - 4Vf \quad (4)$$

$$= 4Vin - Vb - Va - 4Vf$$

When the load current Iout is derived from the cathode of the diode 36d, the output voltage Vout is determined by the equation (5) below.

$$Vout = 4Vin - Vb - Va - 4Vf - \{3Iout/(Cf_0)\} \quad (5)$$

where C is the capacitance of each of the capacitors 35a to 35c, and $f_0$ is the frequency of an output of the oscillator 31.

For example, if Vin=6 V, Va=Vb=0.5 V, Vf=1 V, Iout=5 mA, C=10×10$^4$ (pF), and $f_0$=50 kHz, then Vout=16 V.

The output voltage detector 32 includes voltage-dividing resistors 32a and 32b, a comparator 32c, and a reference power supply 32d. The resistors 32a and 32b have resistance values Ra and Rb, respectively, and produce a desired fraction of the stepped up voltage appearing at the cathode of the diode 36d to develop the voltage Vdiv at a common terminal. The comparator 32c compares the voltage Vdiv with a reference voltage Vref from the reference power supply 32d. When the voltage Vdiv is greater than the reference voltage Vref, the comparator 32c deactivates the oscillator 31. Note that the reference voltage Vref is determined based on a desired voltage output stepped up by the step-up circuit For example, adjustment of the output voltage Vout to a given stepped up voltage of 11 V is achieved by deactivating the oscillator 31 when the output of the comparator 32c is changed to a low level under conditions that the reference voltage Vref=1 V, the resistance value Ra of the voltage-dividing resistor 32a=50 kΩ, the resistance value Rb of the voltage-dividing resistor 32b=5 kΩ.

The electrical energy stored in the backup capacitor 40 by the step-up circuit 30 or the voltage stepped up by the step-up circuit 30 is determined by both the capacitance of the backup capacitor 40 and the electric power required to operate the occupant restraint system for a given period of time (e.g., 100 msec.) after the power supply from the battery Ba is blocked by a vehicle collision. In this embodiment, the voltage stepped up by the step-up circuit 30 is 11 V, but may be changed as needed.

With the above arrangements, the step-up circuit 30 can provide the current required for charging the backup capacitor 40, actuating the switching circuit 50, and detecting a failure of the firing circuit 10. This current is 5 mA in this embodiment.

The backup capacitor 40 is charged by both the battery Ba and the step-up circuit 30. The backup capacitor 40 serves to supply the charged energy to the firing circuit 10 and the crash monitor 20 through the switching circuit 50 for a given period of time if the electric communication between the battery Ba and the ignition switch IG is interrupted during rapid deceleration caused by a vehicle collision. The backup capacitor 40 is, as clearly shown in FIG. 1, connected at one end to ground and has a capacitance of 6800 µF which may be changed as needed.

The switching circuit 50 is designed to either (1) block communication of the step-up circuit 30 and the backup capacitor 40 with the crash monitor 20 when the voltage is normally applied from the battery Ba to the crash monitor 20 through the diode D2 and the conductor 20a or (2) to establish the communication between the backup capacitor 40 and the crash monitor 20 for supplying the electrical energy charged in the backup capacitor 40 to the crash monitor 20 before the voltage supplied from the battery Ba to the crash monitor 20 drops below an operating voltage range (4.8 V or more) if the power supply from the battery Ba to the crash monitor 20 is interrupted by a vehicle crash.

Figure 4:
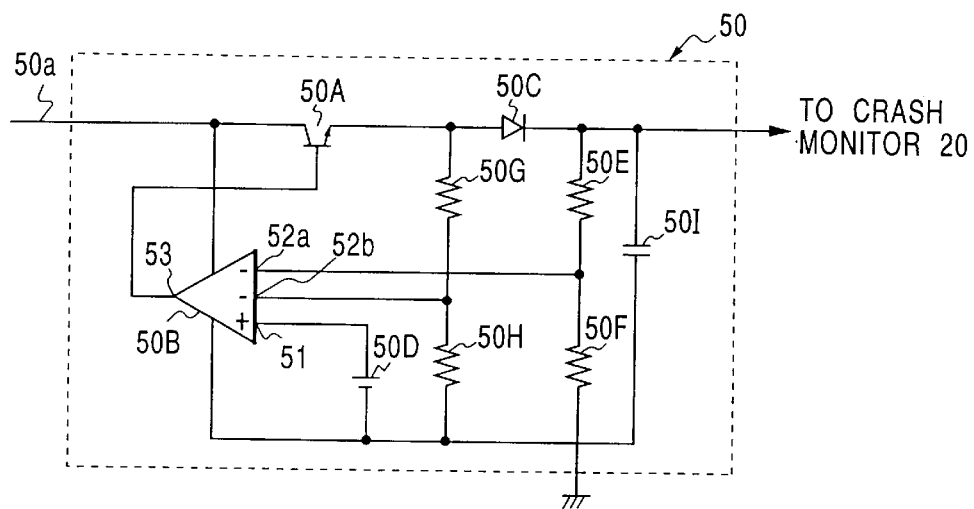
FIG. 4 is a circuit diagram which shows a switching circuit.

Internally, the switching circuit 50 includes, as shown in FIG. 4, a control transistor 50A which is turned on by an operational amplifier 50B to supply the electrical energy stored in the backup capacitor 40 to the crash monitor 20 through a reverse-blocking diode 50C. The control transistor 50A, when turned off, blocks the power supply from the backup capacitor 40 to the crash monitor 20.

Figure 5:
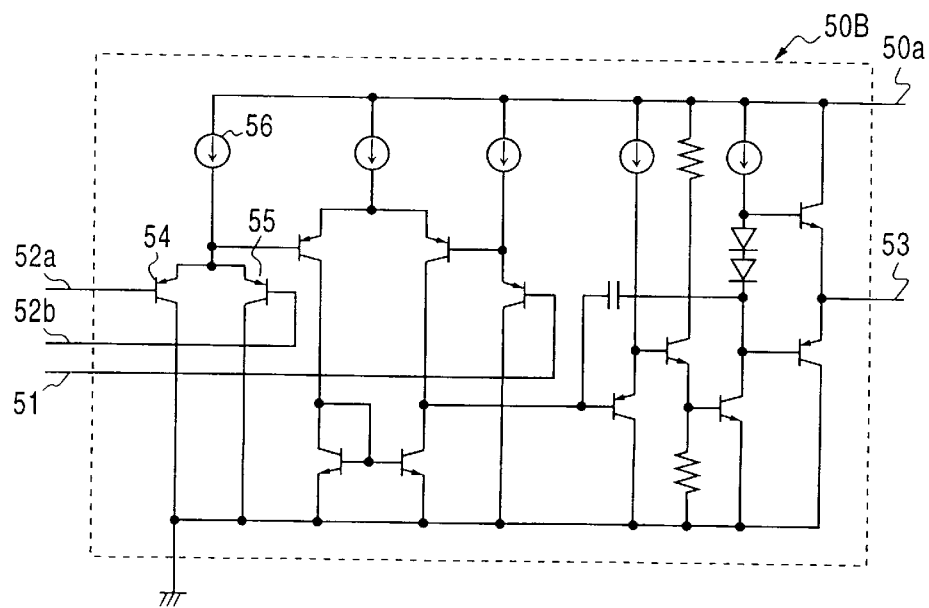
FIG. 5 is a circuit diagram which shows an operational amplifier used in the switching circuit shown in FIG. 4.

The operational amplifier 50B has a plus input terminal (i.e., a non-inverting input) 51, two minus input terminals (i.e., inverting inputs) 52a and 52b, and an output terminal 53 and includes the circuit structure, as shown in FIG. 5, which performs a differential amplitude operation on one of the input terminals 52a and 52b into which a lower voltage is inputted.

Figure 6:
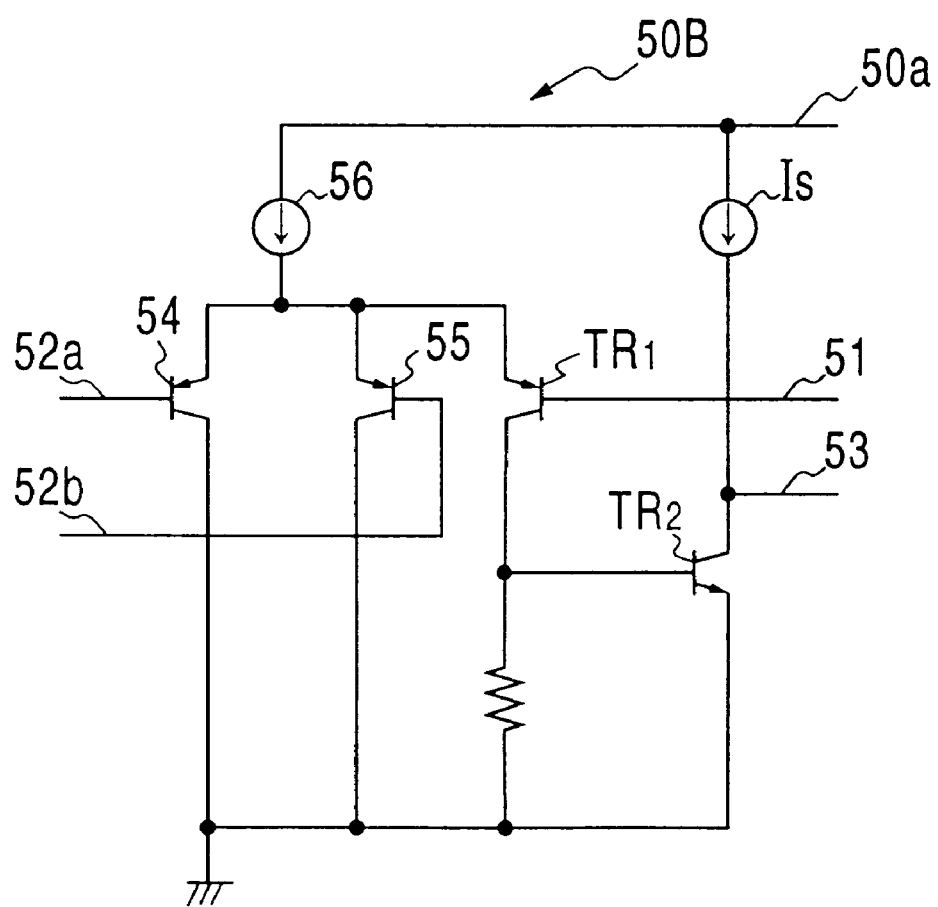
FIG. 6 is a circuit diagram which shows a circuit equivalent to a circuit arrangement shown in FIG. 5.

The circuit structure in FIG. 5 is equivalent to a circuit as shown in FIG. 6, and the switching circuit 50 will be described below with reference to FIG. 6.

The operational amplifier 50B includes a pair of transistors 54 and 55 connected to the input terminals 52a and 52b, an input transistor TR1 connected to the input terminal 51, an output transistor TR2 connected to the output terminal 53, and constant current sources Is and 56.

When the voltage applied to the input terminal 52a is smaller than that applied to the input terminal 52b, the transistor 54 is biased by the voltage appearing at the input terminal 52a to amplify the voltage applied from the constant current source 56. The transistor TR1 is biased by a reference voltage inputted from the reference power supply 50D through the input terminal 51 to amplify the voltage applied from the constant current source 56. The reference voltage of the reference power source 50D is so determined as to set an emitter voltage of the control transistor 50A to a given level.

The transistor TR2 is biased by the difference between the voltages outputted from the transistors 52a and TR1 to amplify the voltage applied from the current source Is and provides it to the base of the control transistor 50A through the output terminal 53. Specifically, the degree of conduction of the control transistor 50A is controlled by the output from the transistor TR2 through the output terminal 53.

Alternatively, when the voltage applied to the input terminal 52b is smaller than that applied to the input terminal 52a, the transistor TR2 is biased by the difference between voltages amplified by the transistors 52b and TR1 to amplify the voltage applied from the current source Is and provides it to the base of the control transistor 50A through the output terminal 53.

The reason that the two minus input terminals 52a and 52b are provided in the operational amplifier 50B will be discussed below.

The switching circuit 50, as already mentioned, establishes the communication between the backup capacitor 40 and the crash monitor 20 to supply the electrical energy stored in the backup capacitor 40 to the crash monitor 20 for maintaining the voltage applied to the crash monitor 20 above 4.8 V when the power supply from the battery Ba to the crash monitor 20 is interrupted. This is achieved by monitoring the voltage at the input terminal 52a, that is, the voltage appearing at the cathode of the diode D2 (i.e., the voltage applied to the crash monitor 20) to control the energization of the control transistor 50A.

However, the monitoring of only the voltage at the cathode of the diode D2 encounters the following drawbacks.

When a sufficient amount of electrical energy is supplied from the battery Ba to the crash monitor 20, the voltage applied to the minus input terminal 52a of the operational amplifier 50B is maintained above the voltage applied to the plus input terminal 51 (i.e., the reference voltage from the reference power supply 50D), thereby turning off the control transistor 50A completely.

If the power supply from the battery Ba is blocked while the control transistor 50A is turned off, the time will be consumed between detection of voltage drop at the cathode of the diode D2 by the operational amplifier 50B and turning on of the control transistor 50A, which may cause the voltage at the cathode of the diode D2 to be changed, leading to a malfunction of the crash monitor 20. This drawback is avoided in this embodiment by providing a capacitor 50I, as will be described later in detail, having a large capacitance enough to compensate for the change in voltage at the cathode of the diode D2.

Specifically, a diode 50C is, as shown in FIG. 4, disposed between the crash monitor 20 and the control transistor 50A. An additional minus input port is provided as the minus input terminal 52b in the operational amplifier 50B which is connected to an anode of the diode 50C through voltage-dividing resistors 50G and 50H. The operational amplifier 50B is, as described above, so designed that one of the minus input terminals 52a and 52b into which a lower voltage is applied functions as a minus input port.

With the above arrangements, even when the voltage of a high level is normally applied from the battery Ba to the cathode of the diode D2, the voltage at the emitter of the control transistor 50A is controlled to show 5.6 V through the operational amplifier 50B based on an input voltage applied to the input terminal 52b. Since the forward voltage drop of the diode 50C is 0.7 V, an output of the control transistor 50A is not added to the crash monitor 20 through the diode 50C.

If the power supply from the battery Ba is interrupted, then the control transistor 50A applies the voltage from the backup capacitor 40 to the diode 50C. This develops a constant voltage of 5 V at the cathode of the diode 50C. Specifically, a variation in voltage applied to the crash monitor 20 caused by block of the voltage supply from the battery Ba is quickly compensated for.

The switching circuit 50 also includes a pair of voltage-dividing resistors 50E and 5OF which provide a given fraction of the voltage developed at the cathode of the diode 50C to the input terminal 52a of the operational amplifier 50B. Resistance values of the divider resistors 50E and 50F are so determined that when the voltage at the cathode of the diode 50C is 5 V (greater than or equal to a lowest operating voltage of the crash monitor 20), the voltage at the input terminal 52a will be equal to the reference voltage of the reference power supply 50D.

The switching circuit 50 also includes, as described above, the pair of voltage-dividing resistors 50G and 50H which provide a given fraction of the voltage developed at the emitter of the control transistor 50A to the input terminal 52b of the operational amplifier 50B. Resistance values of the divider resistors 50G and 50H are so determined that when the voltage at the emitter of the control transistor 50A is 5.6 V, the voltage at the input terminal 52b will be equal to the reference voltage of the reference power supply 50D.

The capacitor 50I is disposed in parallel to the voltage-dividing resistors 50E and 50F and serves as a voltage fluctuation-attenuating filter which removes frequency components of voltage fluctuation appearing at the cathode of the diode 50C to maintain an output of the switching circuit 50 constant.

In operation, when the ignition switch IG is turned on, the electrical energy stored in the battery Ba is supplied to the crash monitor 20 and the step-up circuit 30 through the diodes D2 and D3, respectively. The electrical energy of the battery Ba is also supplied through the diode D1 to the backup capacitor 40, the firing circuit 10, and the switching circuit 50.

The backup capacitor 40 is charged by the electrical energy supplied through the diode D1 and the electrical energy supplied from the step-up circuit 30. The voltage of the battery Ba of the vehicle is usually 12 V, but 6 V in this embodiment in order to ensure the system operation within a range from 6 V to 16 V. Thus, the input voltage applied to the crash monitor 20 will be 5.3 V which is decreased by the forward voltage drop of the diode D2.

Therefore, the input voltage applied to the input terminal 52b of the operational amplifier 50B of the switching circuit 50 becomes higher than that applied to the input terminal 51, thereby causing the operational amplifier 50B to serve to turn off the control transistor 50A. The activity of the diode 50C, however, causes the input voltage applied to the input terminal 52a of the operational amplifier 50B to drop below that applied to the input terminal 52b so that the operational amplifier 50B controls the control transistor 50A to develop 5.6 V at the emitter thereof.

When the voltage stepped up by the step-up circuit 30 has reached 11 V, the output voltage detector 32 detects this event to deactivates the oscillator 31, thereby turning off the step-up circuit 30. The charged voltage of the backup capacitor 40 is thus maintained at 11 V.

The diode 50C is reverse-biased, thereby blocking the communication between the backup capacitor 40 and the crash monitor 20. The step-up circuit 30, thus, supplies the amount of electrical energy only for charging the backup capacitor 40, operating the switching circuit 50, and detecting a failure of the ignition mechanism 10 without energy supply to operate the crash monitor 20. The control transistor 50A is not turned off completely, but in the standby condition where the emitter thereof is maintained at a given voltage level, i.e., 5.6 V (lower than the voltage at the cathode of the diode 50C).

When the communication between the battery Ba and the ignition switch IG is blocked by a vehicle crash so that the energy supply to the crash monitor 20 through the diode D2 is interrupted, it will cause the operational amplifier 50B to increase the degree of conduction of the control transistor 50A in response to the voltage provided by the voltage-dividing resistors 50E and 50F, applied to the input terminal 52a to supply the electrical energy stored in the backup capacitor 40 to the crash monitor 20 through the diode 50C. This maintains the voltage applied to the crash monitor 20 above 4.8 V.

When the crash determining circuit 23 outputs a crash signal to the ignition transistor 14 in response to an output signal of the G-sensor 22 indicating a sudden deceleration of the vehicle, the ignition transistor 14 is turned on to apply the voltage charged in the backup capacitor 40 to the squib 11 through the safing sensor 12 so that the squib 11 is turned on to deploy the air bag.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, when a sufficient amount of electrical energy is supplied from the battery Ba to the crash monitor 20, the control transistor 50A may be turned off completely. This eliminates the need for the diode 50C.

The capacitor 50I may be omitted by controlling the voltage at the emitter of the control transistor 50A to minimize a variation in voltage appearing at the cathode of the diode 50C caused by interruption of the communication between the battery Ba and the system.

The input terminal 52b of the operational amplifier 50B may be omitted, and the benefits of the invention is obtained.

What is claimed is:

1. An occupant safety apparatus for a vehicle comprising:
   an occupant protecting mechanism protecting a vehicle occupant from impact due to a vehicle crash;
   a step-up circuit for stepping up a voltage supplied from a battery;
   a back-up capacitor connected to the step-up circuit and the battery to store electrical energy at a given voltage;
   a crash monitor connected to the battery to monitor deceleration of the vehicle, determine whether a vehicle crash has occurred and provide a crash signal indicative thereof;
   an actuation control circuit responsive to the crash signal from the crash monitor to actuate the occupant protecting mechanism; and
   a switching circuit for selecting between a first and a second power supply mode, the first power supply mode being established to block communication between the back-up capacitor and the crash monitor when the electrical energy of the battery being supplied to the crash monitor falls within a preselected operating voltage range of the crash monitor, the second power supply mode being established to communicate the backup capacitor to the crash monitor when the electrical energy of the battery stored in the backup capacitor to the crash monitor falls within the preselected operating voltage, wherein said switching circuit includes
   a first voltage detector for detecting the voltage of the electrical energy of the battery supplied to said crash monitor,
   a semiconductor device for controlling the degree of the communication between said backup capacitor and a first circuit path from the battery through a diode to the crash monitor,
   a semiconductor switching element blocking communication between the first circuit path and a second circuit path from a gate of the semiconductor device through a reversed-blocking diode connected to said crash monitor in the first power supply mode when the electrical energy of the battery is supplied to said crash monitor within the preselected operating voltage range and establishing the communication between the first circuit path and the second circuit path in the second power supply mode when the electrical energy of the battery drops below the given voltage level, a second voltage detector detecting the voltage of an output from the semiconductor device, and
   a control circuit controlling said semiconductor device to decrease the degree of the communication between said backup capacitor and the first circuit path to apply a first voltage to said semiconductor switching element which blocks the communication between the first and second circuit paths when the voltage detected by said first voltage detector is within the preselected operating voltage range and to increase the degree of the communication path to apply a second voltage greater than the first voltage to said semiconductor switching element to establish the communication between the first and second circuit paths when said first voltage level for supplying the electrical energy stored in said backup capacitor to said crash monitor within the preselected operating voltage range.

2. An occupant safety apparatus as set forth in claim 1, wherein said semiconductor device includes a transistor, said semiconductor switching element including a diode which is connected at an anode to the transistor and at a cathode to said crash monitor, said first and second voltage detectors detecting the voltages appearing at the cathode and the anode of the diode, respectively, said control circuit including a reference power supply producing a reference voltage and a differential amplifier amplifying the difference between the reference voltage and the voltage detected by said second voltage detector to control the transistor so as to provide the first voltage to the diode when the voltage detected by said second voltage detector is lower than the voltage detected by said first voltage detector and also amplifying the difference between the reference voltage and the voltage detected by said first voltage detector to control the transistor so as to provide the second voltage to the diode when the voltage detected by said first voltage detector is decreased below the voltage detected by said second voltage detector.

* * * * *